United States Patent
Liu et al.

(10) Patent No.: US 10,698,605 B2
(45) Date of Patent: Jun. 30, 2020

(54) MULTIPATH STORAGE DEVICE BASED ON MULTI-DIMENSIONAL HEALTH DIAGNOSIS

(71) Applicant: EMC IP Holding Company LLC, Hopkinton, MA (US)

(72) Inventors: Bing Liu, Tianjin (CN); Man Lv, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 104 days.

(21) Appl. No.: 15/710,796

(22) Filed: Sep. 20, 2017

(65) Prior Publication Data

US 2018/0088809 A1 Mar. 29, 2018

(30) Foreign Application Priority Data

Sep. 23, 2016 (CN) .......................... 2016 1 0847954

(51) Int. Cl.
| | |
|---|---|
| *G06F 3/06* | (2006.01) |
| *G06F 11/07* | (2006.01) |
| *H04L 12/24* | (2006.01) |
| *G06F 11/30* | (2006.01) |
| *G06F 11/20* | (2006.01) |
| *H04L 12/26* | (2006.01) |

(52) U.S. Cl.
CPC .......... *G06F 3/0602* (2013.01); *G06F 3/0689* (2013.01); *G06F 11/076* (2013.01); *G06F 11/0727* (2013.01); *G06F 11/20* (2013.01); *G06F 11/201* (2013.01); *G06F 11/3041* (2013.01); *G06F 11/3055* (2013.01); *H04L 41/064* (2013.01); *H04L 41/065* (2013.01); *H04L 41/0663* (2013.01); *H04L 41/0686* (2013.01); *G06F 2201/81* (2013.01); *H04L 43/0817* (2013.01); *H04L 43/0823* (2013.01)

(58) Field of Classification Search
CPC ... G06F 3/0602; G06F 3/0689; H04L 41/064; H04L 41/065; H04L 41/0663; H04L 41/0686
USPC ............................................... 710/5; 714/6.3
See application file for complete search history.

(56) References Cited

U.S. PATENT DOCUMENTS

| | | | | |
|---|---|---|---|---|
| 4,453,215 A | * | 6/1984 | Reid ................... | G06F 11/1625 714/11 |
| 5,506,956 A | * | 4/1996 | Cohen ................. | G06F 11/10 714/6.1 |
| 5,692,106 A | * | 11/1997 | Towers ................ | G06N 5/043 706/45 |
| 5,805,920 A | * | 9/1998 | Sprenkle .............. | G06F 9/544 710/1 |
| 5,949,759 A | * | 9/1999 | Cretegny ............. | H04L 69/40 370/218 |

(Continued)

*Primary Examiner* — Paul R. Myers
(74) *Attorney, Agent, or Firm* — BainwoodHuang

(57) ABSTRACT

Embodiments of the present disclosure provide a method of storage management and an electronic device. The method of storage management includes collecting information indicating an access error in an access path for accessing a storage device; performing a failure diagnosis on the access path based on the access error, the failure diagnosis including at least one of a first diagnosis related to a topology, a second diagnosis related to a history access error, or a third diagnosis related to a protocol; and providing an output related to health status of the access path based on the failure diagnosis.

21 Claims, 7 Drawing Sheets

(56) References Cited

U.S. PATENT DOCUMENTS

| | | | |
|---|---|---|---|
| 6,115,798 A * | 9/2000 | Hayasaka | G06F 11/1441 707/999.202 |
| 6,532,440 B1 * | 3/2003 | Boppana | G01R 31/31835 703/14 |
| 6,895,189 B1 * | 5/2005 | Bedrosian | H04B 10/272 370/503 |
| 6,944,684 B1 * | 9/2005 | Kinjo | G06F 3/0613 710/31 |
| 7,146,544 B2 * | 12/2006 | Hsu | G06F 11/0709 714/57 |
| 7,249,286 B1 * | 7/2007 | Krishnan | H04L 41/0663 714/27 |
| 8,074,101 B1 * | 12/2011 | Vohra | G06F 11/004 714/4.1 |
| 8,204,498 B1 * | 6/2012 | Smith | G06F 11/2294 455/423 |
| 8,411,688 B2 * | 4/2013 | Farkas | H04L 12/4645 370/225 |
| 8,811,158 B1 * | 8/2014 | Addepalli | H04L 45/28 370/225 |
| 8,843,789 B2 | 9/2014 | Sandstrom et al. | |
| 8,856,584 B2 * | 10/2014 | Matsubara | H04L 45/22 370/217 |
| 2002/0138801 A1 * | 9/2002 | Wang | G01R 31/31704 714/729 |
| 2003/0231654 A1 * | 12/2003 | Gilchrist | H04M 7/1245 370/467 |
| 2005/0188239 A1 * | 8/2005 | Golasky | G06F 11/201 714/2 |
| 2005/0193228 A1 * | 9/2005 | Miki | G06F 11/2092 714/5.11 |
| 2006/0050630 A1 * | 3/2006 | Kobayashi | H04L 67/1097 370/216 |
| 2006/0107089 A1 | 5/2006 | Jansz et al. | |
| 2006/0212855 A1 * | 9/2006 | Bournas | G05B 19/41865 717/140 |
| 2006/0256712 A1 * | 11/2006 | Imajuku | H04J 14/0284 370/218 |
| 2007/0100586 A1 * | 5/2007 | Cheng | G01R 31/31854 702/185 |
| 2007/0143583 A1 * | 6/2007 | Cors | G06F 3/0605 713/1 |
| 2007/0180293 A1 | 8/2007 | Takahashi | |
| 2007/0189663 A1 * | 8/2007 | Hirai | H04Q 11/0005 385/24 |
| 2007/0280120 A1 * | 12/2007 | Wong | H04L 41/0869 370/242 |
| 2008/0137669 A1 * | 6/2008 | Balandina | H04L 45/00 370/400 |
| 2008/0295043 A1 * | 11/2008 | Chang | G06F 17/5045 716/103 |
| 2009/0106327 A1 * | 4/2009 | Dilman | G06F 11/0727 |
| 2009/0225652 A1 * | 9/2009 | Vasseur | H04L 41/0677 370/225 |
| 2010/0195489 A1 * | 8/2010 | Zhou | H04L 12/433 370/216 |
| 2010/0241899 A1 * | 9/2010 | Mayer | G06F 11/0772 714/10 |
| 2011/0060968 A1 * | 3/2011 | Warren | G06F 11/1068 714/773 |
| 2011/0138219 A1 * | 6/2011 | Walton | G06F 11/0712 714/3 |
| 2013/0238940 A1 * | 9/2013 | Chalmers | G06F 11/3688 714/41 |
| 2015/0089280 A1 * | 3/2015 | Sade | G06F 11/073 714/6.12 |
| 2015/0128260 A1 * | 5/2015 | Qiang | G06F 16/13 726/22 |
| 2016/0342437 A1 * | 11/2016 | Khemani | G06F 9/45558 |
| 2017/0017549 A1 * | 1/2017 | Fukuzumi | G06F 11/202 |
| 2017/0163286 A1 * | 6/2017 | Wu | G06F 13/385 |
| 2017/0317953 A1 * | 11/2017 | Sareen | H04L 49/25 |

* cited by examiner

MULTIPATH STORAGE DEVICE BASED ON MULTI-DIMENSIONAL HEALTH DIAGNOSIS

RELATED APPLICATIONS

This application claim priority from Chinese Patent Application Number CN201610847954.5, filed on Sep. 23, 2016 at the State Intellectual Property Office, China, titled "MULTIPATH STORAGE DEVICE BASED ON MULTI-DIMENSIONAL HEALTH DIAGNOSTIC METHOD" the contents of which is herein incorporated by reference in its entirety.

FIELD

Embodiments of the present disclosure generally relate to storage technology, and more particularly, to a storage management method and an electronic device.

BACKGROUND

For most of enterprise storage solutions, multipath approaches are introduced to support high availability of the storage system. The multipath approaches are used to provide a path redundancy solution for a storage device with a backup access path. As used herein, terms "access path," "I/O path" or "path" generally refers to input output I/O paths including various components of a storage device, such as an I_T nexus model in a small computer system interface (SCSI) architecture. For example, for a serial SCSI (SAS) domain based storage product, an access path may include a host bus adapter (HBA) card, an SAS expander, a target driver, and so on.

A main problem in existing multipath solutions is their path heath diagnosis methods which only focus on one aspect of error information, such as SCSI error information at a lower layer. However, a single aspect of error information is often insufficient (or not intelligent enough) to help make a good path related strategy. Thus, the existing multipath solutions are unable to make efficient and accurate path health diagnosis and hardly meet performance requirements of a storage system.

SUMMARY

The embodiments of the present disclosure provide a method of storage management and an electronic device.

According to a first aspect of the present disclosure, there is provided a method of storage management, the method including: collecting information indicating an access error in an access path for accessing a storage device; performing a failure diagnosis on the access path based on the access error, the failure diagnosis including at least one of a first diagnosis related to a topology, a second diagnosis related to a history access error, or a third diagnosis related to a protocol; and providing, based on the failure diagnosis, an output related to health status of the access path.

In some embodiments, performing the first diagnosis on the access path may include: detecting at least one access path which is topologically associated with the access path and in which the access error also occurs; in response to the at least one associated access path being detected, determining a number of the at least one associated access path; and in response to the number of the at least one associated access path being greater than a first threshold, determining that a topology of the access path is in unhealthy status.

In some embodiments, detecting the at least one associated access path may include: obtaining topology information of access paths of the storage device; detecting, based on the topology information, candidate access paths topologically associated with the access path; and determining at least one of the candidate access paths with the access error occurred as the at least one associated access path.

In some embodiments, providing the output related to the health status of the access path may include: in response to determining that the access path is in the unhealthy status through the first diagnosis, indicating that there is a failure in a common component of the access path and the at least one associated access path.

In some embodiments, performing the second diagnosis on the access path may include: determining an occurrence number of the access error in the access path in the past; and in response to the occurrence number being greater than a second threshold, determining that the access path is in unhealthy status.

In some embodiments, providing the output related to the health status of the access path may include: in response to determining that the access path is in the unhealthy status through the second diagnosis, instructing to abandon reinstallation of the access path.

In some embodiments, performing the third diagnosis on the access path may include: counting errors related to a protocol in the access path; and in response to a number of the errors being greater than a third threshold, determining that the access path is in unhealthy status.

In some embodiments, the errors related to a protocol may include at least one of an error at a protocol layer of a small computer system interface (SCSI), an error at a protocol layer of a serial small computer system interface (SAS), or an error specific to a vendor.

In some embodiments, providing the output related to the health status of the access path may include: in response to determining that the access path is in the unhealthy status through the failure diagnosis, searching for an available backup access path; in response to a hit of the available backup access path, providing an indication of the available backup path; and in response to failing to hit the available backup access path, providing an indication of an access operation failure.

In some embodiments, providing the output related to the health status of the access path may include: in response to determining that the access path is in the unhealthy status through the failure diagnosis, sending a failure alarm for the access path as a response to path health monitoring.

In some embodiments, providing the output related to the health status of the access path may include: in response to determining that the access path is in the unhealthy status through the failure diagnosis, providing an indication that the access path is unable to be a backup access path for a further access path.

According to a second aspect of the present disclosure, there is provided an electronic device. The device includes at least one processor and at least one memory including computer program instructions. The at least one memory and the computer program instructions are configured, with the processor, to cause the device to: collect information indicating an access error in an access path for accessing a storage device; perform a failure diagnosis on the access path based on the access error, the failure diagnosis including at least one of a first diagnosis related to a topology, a second diagnosis related to a history access error, or a third diagnosis related to a protocol; and provide, based on the failure diagnosis, an output related to health status of the access path.

In some embodiments, the at least one memory and the computer program instructions can be further configured, with the processor, to cause the device to perform the first diagnosis on the access path by: detecting at least one access path which is topologically associated with the access path and in which the access error also occurs; determining a number of the at least one associated access path in response to the at least one associated access path being detected; and determining that a topology of the access path is in unhealthy status in response to the number of the at least one associated access path being greater than a first threshold.

In some embodiments, the at least one memory and the computer program instructions can be further configured, with the processor, to cause the device to detect the at least one associated access path by: obtaining topology information of access paths of the storage device; detecting, based on the topology information, candidate access paths topologically associated with the access path; and determining at least one of the candidate access paths with the access error occurred as the at least one associated access path.

In some embodiments, the at least one memory and the computer program instructions can be further configured, with the processor, to cause the device to provide the output related to the health status of the access path by indicating that there is a failure in a common component of the access path and the at least one associated access path in response to determining that the access path is in the unhealthy status through the first diagnosis.

In some embodiments, the at least one memory and the computer program instructions can be further configured, with the processor, to cause the device to perform the second diagnosis on the access path by: determining an occurrence number of the access error in the access path in the past; and determining that the access path is in unhealthy status in response to the occurrence number being greater than a second threshold.

In some embodiments, the at least one memory and the computer program instructions can be further configured, with the processor, to cause the device to provide the output related to the health status of the access path by instructing to abandon reinstallation of the access path in response to determining that the access path is in the unhealthy status through the second diagnosis.

In some embodiments, the at least one memory and the computer program instructions can be further configured, with the processor, to cause the device to perform the third diagnosis on the access path by: counting errors related to a protocol in the access path; and determining that the access path is in unhealthy status in response to a number of the errors being greater than a third threshold.

In some embodiments, the errors related to a protocol may include at least one of an error at a protocol layer of a small computer system interface (SCSI), an error at a protocol layer of a serial small computer system interface (SAS), or an error specific to a vendor.

In some embodiments, the at least one memory and the computer program instructions can be further configured, with the processor, to cause the device to provide the output related to the health status of the access path by: searching for an available backup access path in response to determining that the access path is in the unhealthy status through the failure diagnosis; providing an indication of an available backup path in response to a hit of the available backup access path; and providing an indication of an access operation failure in response to failing to hit the available backup access path.

In some embodiments, the at least one memory and the computer program instructions can be further configured, with the processor, to cause the device to provide the output related to the health status of the access path by sending a failure alarm for the access path as a response to path health monitoring in response to determining that the access path is in the unhealthy status through the failure diagnosis.

In some embodiments, the at least one memory and the computer program instructions can be further configured, with the processor, to cause the device to provide the output related to the health status of the access path by providing an indication that the access path is unable to be a backup access path for a further access path in response to determining that the access path is in the unhealthy status through the failure diagnosis.

According to a third aspect of the present disclosure, there is provided a computer program product. The computer program product is tangibly stored in a non-volatile computer readable medium and includes machine executable instructions which, when executed, cause a machine to perform steps of the method according to the first aspect.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

Throughout the drawings, the same or similar reference symbols refer to the same or similar elements.

DETAILED DESCRIPTION OF EMBODIMENTS

Figure 1:
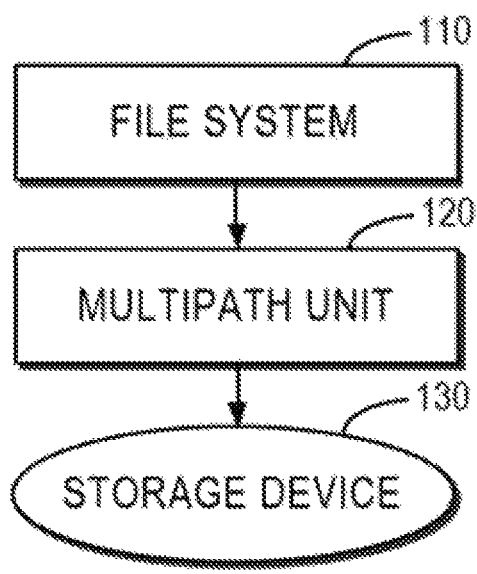
FIG. 1 schematically illustrates a diagram of a multipath access technology scenario of a storage device in which the embodiments of the present disclosure may be implemented.

Principles and spirits of example embodiments disclosed herein will now be described with reference to various example embodiments illustrated in the drawings. It should be appreciated that description of those embodiments is merely to enable those skilled in the art to better understand and further implement example embodiments disclosed herein and not intended for limiting the scope disclosed herein in any manner.

FIG. 1 schematically illustrates a diagram of a multipath access technology scenario of a storage device in which the embodiments of the present disclosure may be implemented. As shown in FIG. 1, a request (for example, an I/O request) for accessing a storage device 130 from a file system 110 may reach the storage device 130 via a multipath unit 120. This solution has been widely used in the existing storage products. It is to be understood that FIG. 1 only briefly illustrates elements or components closely related to the present disclosure. In other embodiments, such as a multipath access scenario in a backend storage software stack, a multipath access process may involve more elements or components, for instance, Redundant Array of Independent Disks (RAID), SCSI core layer, HBA driver, and so on.

In a multipath solution, a multipath unit 120 may operate with other components to achieve different functions. The first function is I/O path selection. When an I/O comes from an upper layer, the multipath unit 120 needs to select a path for the I/O. The path selection can be based on different policies. Furthermore, when an I/O response returns from a lower driver layer, if the access fails, the multipath unit 120 needs to determine error handling logic, for instance, whether to retry, to use a backup path, or to give up this I/O access.

The second function is path health monitoring. By monitoring statistics related to path health, the multipath unit 120 can help give an alarm about a problematic path or reinstall a recovered path.

The third function is pre-checking for swapping of a path component (for example, an HBA). For example, when a technical supporting person decides to swap a problematic HBA in a path without switching off the storage system, it should be ensured that there is a backup access path in the storage system and the health status of the backup access path is pre-checked. As a HBA swapping operation is only allowed under presence of a healthy backup path, the multipath unit 120 needs to provide a report about health of the backup access path for the pre-checking.

As mentioned in the above, the existing multipath solutions cannot perform efficient and accurate path health diagnosis and fails to meet performance requirements of a storage system. For example, in I/O path selection, the existing multipath methods focus on I/O performance and load balance. These policies may include polling, minimum queue length, and minimum service time. However, since the existing multipath methods do not take path health status into account, it is inevitable that a user encounters access problems during access. In terms of path health diagnosis, the existing multipath methods usually make use of SCSI error information to make their policies. This one-sided health diagnosis is not efficient enough to analyze relations between different errors, namely, error correlation, from a perspective of system scope. The defect has caused many problems for the existing multipath solutions in actual application.

More specifically, the following three problematic situations are problems that are likely to arise when different functions are implemented with the existing multipath solutions. These problematic situations have actually occurred in some storage systems and reported by users for multiple times.

In the first problematic situation, the existing multipath methods generally employ the SCSI command "test unit ready (TUR)" to check problematic paths. However, some faulty storage devices may accept a TUR command but reject an IO command. Hence, for paths in such storage devices, the existing multipath solutions will result in an endless loop of state transition, that is, access failure, reactivating the path after TUR checking, and access failure again. Consequently, the faulty storage device cannot be separated from the storage system in time, gravely lowering the performance of the storage system.

In the second problematic situation, when an HBA is doing host reset, I/O performance will be affected severely. Furthermore, if the HBA is frequently busy on host resetting, it implies that some problems have already existed in the path. However, from a perspective on the multipath unit side, when the path selection is decided, it is not aware of such a fact. As a result, a slow I/O path is still selected at this moment.

In the third problematic situation, in many cases, a driver cannot obtain a valid SCSI key or sense data from an I/O error for error analysis. However, from a perspective of the multipath unit, it expects to triage errors, for example, whether a failure is caused by a problematic HBA, a problematic path, connection problems, or a problematic driver. This is important for reporting path health status correctly, particularly when the multipath unit is employed in the scenario of pre-checking before a component (e.g., an HBA) is swapped.

Therefore, the existing multipath solutions do not operate with an efficient and intelligent path health diagnosis method. Consequently, they cannot handle problems in the above problematic situations that a user may encounter. In view of the above defects in the conventional solutions, the embodiments of the present disclosure provide a storage management method and an electronic device to solve technical problems in the conventional solutions.

Figure 2:
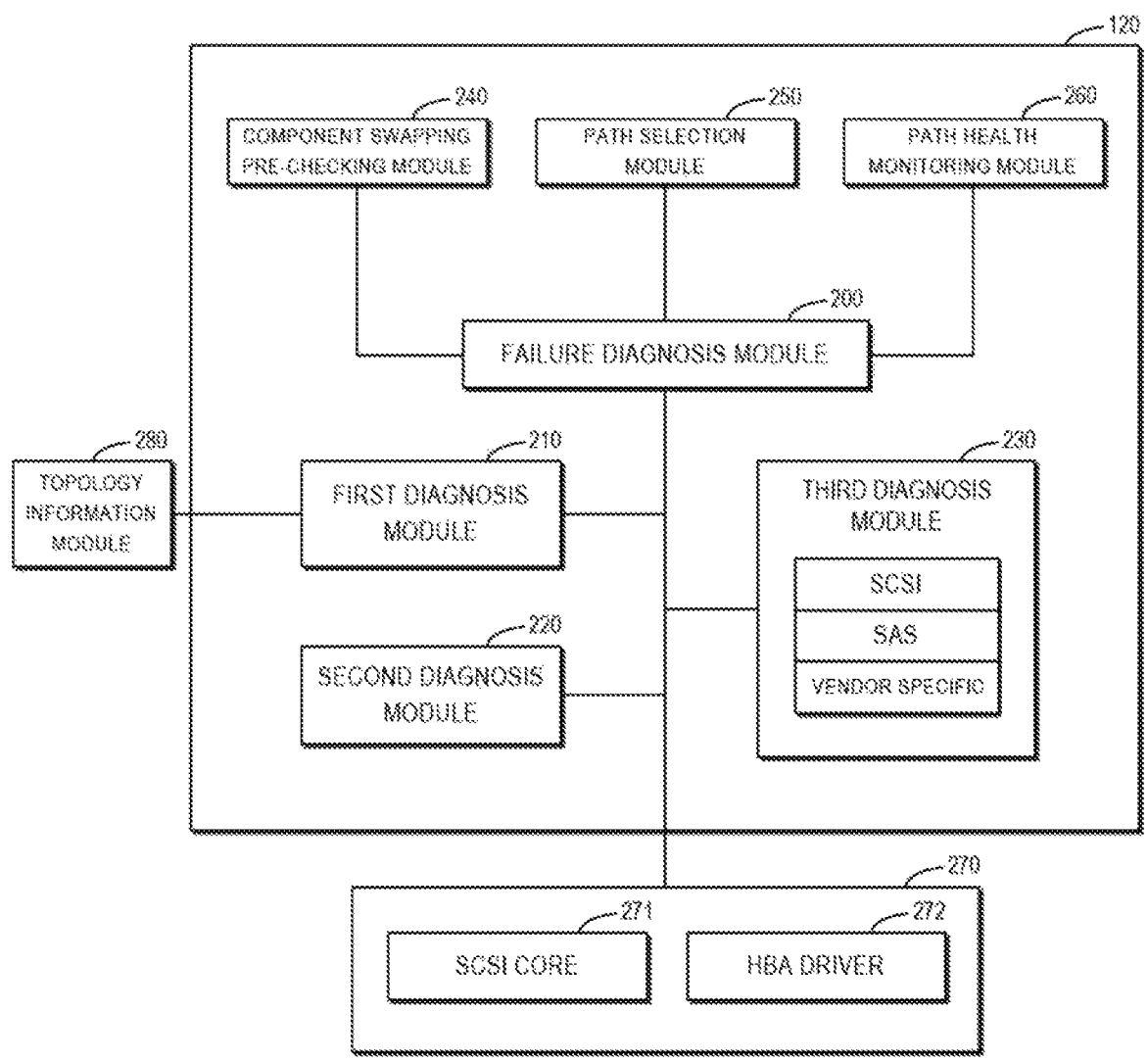
FIG. 2 schematically illustrates a block diagram of a multipath unit that may implement a storage management method according to the embodiments of the present disclosure.

FIG. 2 schematically illustrates a block diagram of a multipath unit 120 that may implement the storage management method according to the embodiments of the present disclosure. As illustrated in FIG. 2, the multipath unit 120 according to the embodiments of the present disclosure includes a failure diagnosis module 200 for performing a failure diagnosis. The failure diagnosis module 200 performs a diagnosis of a plurality of different aspects or dimensions with a first diagnosis module 210, a second diagnosis module 220 and a third diagnosis module 230. As will be described in detail in the following, the examples of the diagnosis may include but are not limited to a first diagnosis related to a topology, a second diagnosis related to a history access error, and a third diagnosis related to a protocol.

As further shown in FIG. 2, the failure diagnosis module 200 also achieves the three functions of the pre-checking for path component swapping, the path selection and the path health monitoring previously described with a component swapping pre-checking module 240, a path selection module 250 and a path health monitoring module 260. Moreover, the multipath unit 120 further receives error information and topology information from an error information providing module 270 and a topology information module 280 to perform an error diagnosis.

During the operation, when a multipath unit 120 needs to perform a path health diagnosis for different functions, it collects error statistics from the error information providing module 270 and tries to obtain some useful conclusions with an error correlation method. This error correlation involves a history dimension, a topology dimension and a protocol dimension. Then, taking advantage of the path health diagnosis result, the multipath unit 120 can suggest path selection, give alarm for a problematic path or perform path pre-checking before swapping of a path component with the component swapping pre-checking module 240, the path selection module 250 and the path health monitoring module 260.

Thus, different from the existing path health diagnosis solutions, the multipath unit 120 according to the embodiments of the present disclosure performs a health diagnosis of multiple dimensions, and its idea derives from a system-wide perspective. It collects different kinds of error information and tries to mine useful information from the error correlation to help check path health status. This mined information may include a topology dimension, a history dimension, a protocol dimension, and so on. This kind of multi-dimensional analysis provides more intelligence and helps to perform a path health diagnosis more efficiently and accurately. In the following, the operation process of the multipath unit 120 according to the embodiments of the present disclosure as well as the functions of the various modules and the interaction between them will be described in detail with reference to FIG. 3.

Figure 3:
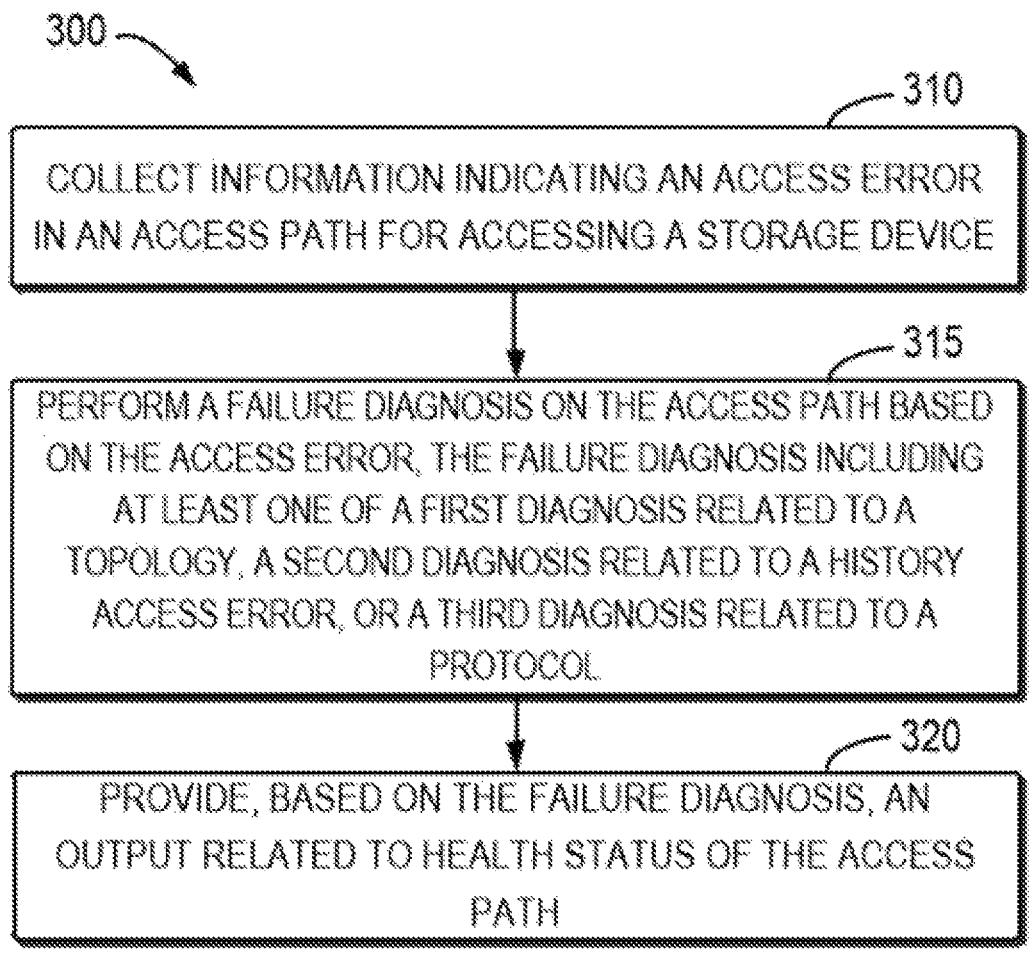
FIG. 3 schematically illustrates a flowchart of the storage management method according to the embodiments of the present disclosure.

FIG. 3 schematically illustrates a flowchart of the storage management method 300 according to the embodiments of the present disclosure. In some embodiments, the method 300 can be implemented by the multipath unit 120 depicted in FIG. 2. FIG. 2 schematically illustrates units or modules that may be used to implement various steps of method 300. To better describe the operating principles of the present disclosure, the method 300 shown in FIG. 3 will be described with reference to FIG. 2. It should be noted that the various specific modules described in FIG. 2 are only examples and not intended to limit the embodiments of the present disclosure in any manner.

At 310, the multipath unit 120 collects information indicating an access error in an access path for accessing the storage device 130. For example, as mentioned above, the three main functions of the multipath unit 120 are the pre-checking function for path component swapping, the path selection function, and the path health monitoring function. Therefore, the multipath unit 120 can collect the information in response to the three functions, respectively, to perform a path health diagnosis to help implement these functions.

In the scenario where a component (such as an HBA card or a expander) in a certain path need to be swapped, the multipath unit 120 may receive an instruction for pre-checking via the component swapping pre-checking module 240, where the component swapping pre-checking module 240 is an interface of the multipath unit 120 for providing path health pre-checking before a swapping operation of a path component is performed. In response to receiving the instruction, the multipath unit 120 may start collecting information indicating an access error of an access path for accessing the storage device 130 to perform a diagnosis of path health.

In the scenario of path selection, if access via a certain access path fails, the multipath unit 120 may receive an instruction for performing a health diagnosis on this access path via the path selection module 250, where the path selection module 250 is an interface of the multipath unit 120 for providing path selection to incoming I/O requests. In response to receiving the instruction, the multipath unit 120 may start collecting information indicating an access error in the access path for accessing the storage device 130 to perform a diagnosis of path health.

In the path health monitoring scenario, the multipath unit 120 may receive an instruction for monitoring path health via the path health monitoring module 260, where the path health monitoring module 260 can be running as a daemon process. In response to receiving an instruction, the multipath unit 120 may start collecting information indicating an access error of an access path for accessing the storage device 130 to perform a diagnosis of path health.

In the embodiment described in FIG. 2, the multipath unit 120 can collect the information indicating an access error of an access path for accessing the storage device 130 from the error information providing module 270. In some embodiments, the error information providing module 270 includes an SCSI core module 271 and an HBA driver 272. The SCSI core module 271 may include an SCSI core layer which handles I/O responses from the HBA driver and collects SCSI related error information of I/O (such as an SCSI sensing key/sensing data, etc.). The HBA driver 272 may include an SCSI lower layer which focuses on protocol-related errors (such as an SAS protocol, serial advanced technology attachment (SATA) protocol, etc.) or errors specific to a vendor, compared with the SCSI core layer.

Continuing to refer to FIG. 3, at 315, the multipath unit 120 performs a failure diagnosis on the access path based on the access error. For example, in the embodiment depicted in FIG. 2, the multipath unit 120 may perform the failure diagnosis for the access path with a failure diagnosis module 200. Specifically, the failure diagnosis includes at least one of a first diagnosis related to a topology, a second diagnosis related to a history access error, and a third diagnosis related to a protocol, which can also be referred to as a health diagnosis of different dimensions. In the embodiment depicted in FIG. 2, the first diagnosis, the second diagnosis and the third diagnosis can be performed by the first diagnosis module 210, the second diagnosis module and the third diagnosis module 230, respectively. They can gather diagnosis results of their respective dimension to the failure diagnosis module 200 to obtain a final diagnosis result. For example, the failure diagnosis module 200 and diagnosis modules 210, 220 and 230 of different dimensions operate cooperatively to provide the final diagnosis result. In some embodiments, if the diagnosis result of any dimension is in unhealthy status, then the failure diagnosis module 200 may determine that the result of the path diagnosis is in unhealthy status and can provide a report of the path with failure to the client.

In the first diagnosis related to a topology, the first diagnosis module 210 can detect access paths which are topologically associated with the faulty access path and in which the same access error also occurs. Here, the associated access paths may be access paths sharing one or more components (such as an HBA card and an expander) with the faulty access path. In response to such associated access paths being detected, the first diagnosis module 210 can determine the number of the associated access paths having the same access error. In response to determining that the number is greater than a first threshold, the first diagnosis module 210 can determine that a topology of the faulty access path is in unhealthy status. It is to be understood that the first threshold can be set based on the specific technical environment and requirements.

In the first diagnosis, the first diagnosis module 210 can obtain topology information of access paths of the storage device from the topology information module 280 which maintains the overall topology information of the system. In some embodiments, the topology information can be described as a storage device graph, wherein nodes in the graph represent various components, such as a driver, an expander or an HBA, and an edge in the graph represents a connection between two components. According to the topology information, the first diagnosis module 210 can know which paths use the same components, such as HBAs or expanders. The first diagnosis module 210 can detect candidate access paths topologically associated with the faulty access path based on the topology information. Therefore, the first diagnosis module 210 can determine access paths of the candidate access paths with the access error occurred as the above associated access paths.

Thus, in the first diagnosis, the multipath unit 120 provides path health status for different functions (path selection, path health monitoring, or pre-checking for path component swapping) from a perspective of topology error correlation. In specific operations, the multipath unit 120 can firstly retrieve the topology information and find out which paths are using the same components (HBAs, expanders, etc.) as the given path and these paths can be called as a path domain. Then, the multipath unit 120 can map the collected path errors to the path domain. Lastly, the multipath unit 120 can detect if the same or similar path errors happen in the whole path domain at the same time. If so, then the multipath unit 120 can report the problematic paths as a result of analysis of topology error correlation and determine that the topology of the access path is in unhealthy status.

In the second diagnosis related to a history access error, the second diagnosis module 220 can determine the occurrence number of the access error in the access path in the past. In response to determining that the occurrence number is greater than a second threshold, the second threshold module 220 can determine that the access path is in unhealthy status. It is to be understood that the second threshold here can be set based on the specific technical environment and requirements.

In the second diagnosis, the multipath unit 120 provides path health status for different functions (the path selection, the path health monitoring, or the pre-checking for path component swapping) from a perspective of correlation of history errors. The multipath unit 120 searches path errors for a given path from the collected path errors. Then, the multipath unit 120 may detect if errors of a specific type frequently occur on the path in a time window. If so, then it may report the problematic path as the result of history error correlation and determine that the access path is in unhealthy status.

In the third diagnosis related to a protocol, the third diagnosis module 230 may count errors of the faulty access path which are related to a protocol In response to determining that the number of such errors is greater than a third threshold, the third diagnosis module 230 can determine that the access path is in unhealthy status. It is to be understood that the third threshold here can be set based on the specific technical environment and requirements. Here, the errors related to the protocols may include at least one of an error at a protocol layer of a small computer system interface (SCSI), an error at a protocol layer of a serial small computer system interface (SAS), and an error specific to a vendor.

In the third diagnosis, the multipath unit 120 may collect I/O error statistics, including I/O error statistics of an SCSI layer, I/O error statistics of a protocol layer (such as SAS), and I/O error statistics specific to a vendor, and then give a more accurate path related diagnosis. Taking an SAS HBA scenario as an example, the multipath unit 120 can obtain a protocol layer error code "OPEN_FAILURE" and detailed reasons about the error which may include "pathway blocked," "Open timeout," "SATA initialization timeout," or "protocol not supported" (or other reasons). They can be collected for further analysis. For example, if the error is due to "pathway blocked," it can be determined that the path has a problem. If the error is due to "SATA initialization timeout," then it is inclined to consider that there is a problem in the storage device.

Continuing to refer to FIG. 3, at 320, the multipath unit 120 provides an output related to health status of the access path based on the failure diagnosis. For example, in the respective scenarios for performing three different functions, the multipath unit 20 can provide an output about health status of an access path by means of the component swapping pre-checking module 240, the path selection module 250 and the path health monitoring module 260, respectively.

In a scenario where a component in a path (such as an HBA card, an expander, etc.) needs to be swapped, in response to determining that an access path is in unhealthy status with the failure diagnosis module 200, the multipath unit 120 can provide, by means of the component swapping pre-checking module 240, an indication that the access path is unable to be a backup access path for a further access path. On the other hand, if the failure diagnosis module 200 determines that the access path is in healthy status, then the multipath unit 120 can provide, by means of the component swapping pre-checking module 240, an indication that the access path can be used as a backup access path for a further access path.

In the scenario of path selection, if access via a certain access path fails and the failure diagnosis module 200 determines that the access path is in unhealthy status, then the multipath unit 120 can search for an available backup access path. In response to a hit of an available backup access path, the multipath unit 120 can provide an indication of the backup access path by means of the path selection module 250. If an available backup access path is not found, then the multipath unit 120 can provide an indication of an access operation failure by means of the path selection module 250.

It can be seen that the multipath unit 120 according to the embodiments of the present disclosure employs an "error aware" path selection manner which takes multi-dimensional error information into consideration, where its policy may include multiple perspectives. From the historical perspective, if a path fails and is reactivated (or host reset) in a time window for too many times, then the multipath unit 120 will abandon reinstallation of the path, which can effectively prevent the first problematical situation mentioned in the previously for the existing multipath solutions. From the perspective of topology, if the multipath unit 120 is aware that a plurality of paths using a same component (such as an HBA) have a same or similar problem but cannot make sure that the path fails, then the topology dimension diagnosis will deduce that the problematic component is the HBA. Then, for an incoming I/O, the multipath unit 120 will avoid selecting access paths via this HBA. Both of the above approaches employ error correlation information to help perform path health diagnosis, one from the dimension of history and the other from the dimension of topology. It is to be understood that although I/O path selection is employed as an example here, this kind of approach can also be applied to the functions of path health monitoring and pre-checking for path component swapping.

In the scenario of path health monitoring, in response to determining that an access path is in unhealthy status with the failure diagnosis module 200, the multipath unit 120 can send, by means of the path health monitoring module 260, a failure alarm for the access path as a response to the path health monitoring. On the other hand, if the failure diagnosis module 200 determines that the access path is in healthy status, then the multipath unit 120 can send an indication that the access path is in healthy status with the path health monitoring module 260 or does not send any feedback to imply tacitly that the access path has no problems.

Furthermore, in some embodiments, in case that the diagnosis result of the first diagnosis module 210 is in unhealthy status, the multipath unit 120 can indicate that there is a failure in a common component of the faulty access path and the associated access paths so as to check and replace the component with the failure. In case that the diagnosis result of the second diagnosis module 220 is in unhealthy status, the multipath unit 120 can instruct to abandon reinstallation of the faulty access path to avoid the endless loop as described above.

Figure 4:
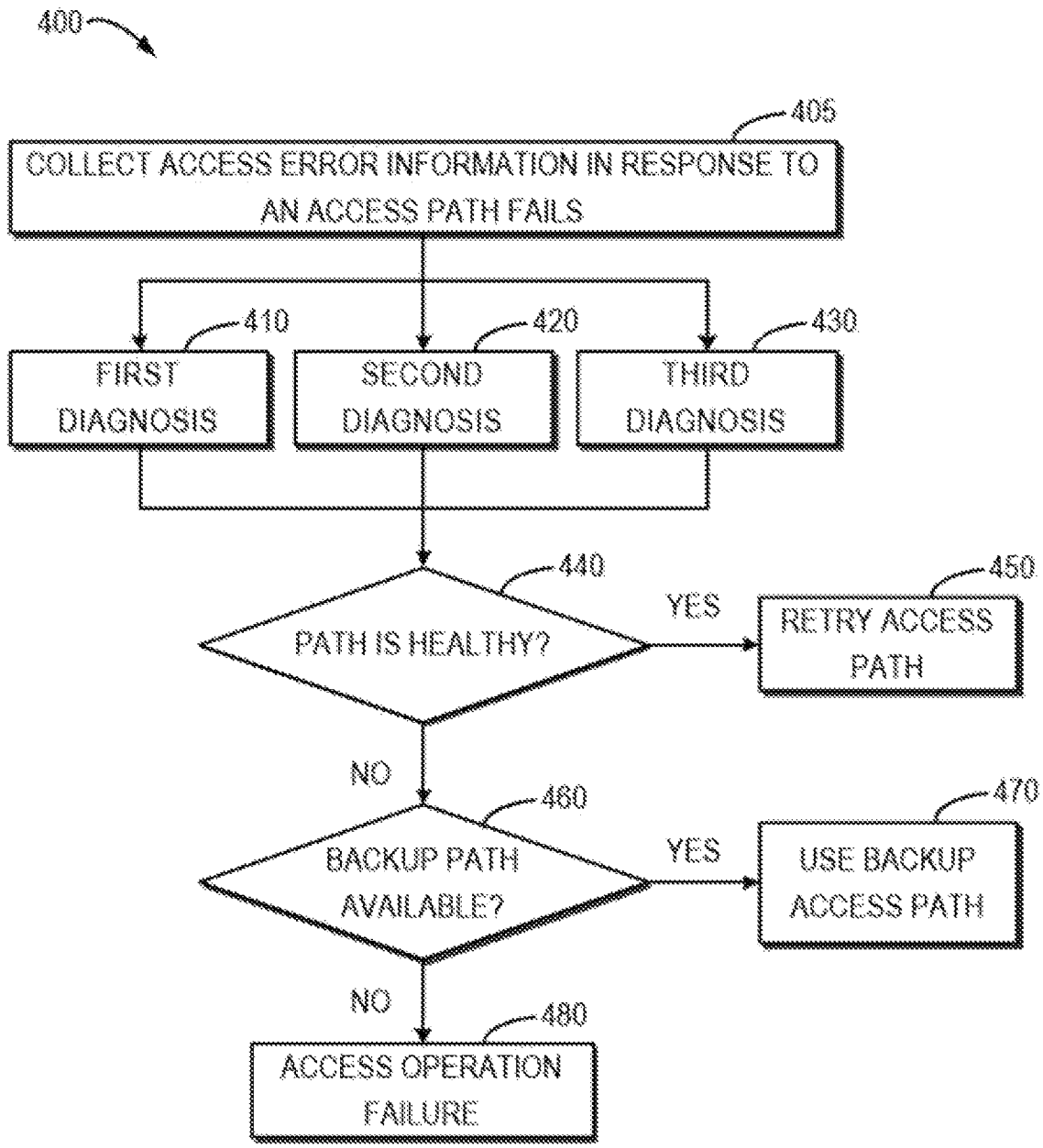
FIG. 4 schematically illustrates a process of a path selection function of the storage management method according to the embodiments of the present disclosure.

FIG. 4 schematically illustrates a process 400 of the path selection function of the storage management method 300 according to the embodiments of the present disclosure. Particularly, the process 400 depicts a specific processing process of the multipath unit 120 when performing the path selection function. Therefore, the process 400 belongs to a specific implementation of the method 300 shown in FIG. 3. It is to be noted that FIG. 4 only depicts an example, without intention to limit the embodiments of the present disclosure in any manner.

As shown in FIG. 4, at 405, in response to that a certain access path fails, the multipath unit 120 collects information of an access error in the access path. For example, the multipath unit 120 can obtain the information from the error information providing module 270.

At 410, 420 and 430, the multipath unit 120 performs the first diagnosis, the second diagnosis and the third diagnosis, respectively. For example, the multipath unit 120 can perform the first diagnosis, the second diagnosis and the third diagnosis by means of the first diagnosis module 210, the second diagnosis module 220 and the third diagnosis module 230, respectively. The specific content and the diagnosing process of the first diagnosis, the second diagnosis and the third diagnosis have been described above in detail, thus omitted here. It is to be understood that although blocks 410, 420 and 430 in FIG. 4 are depicted to be performed in parallel, other implementations are also possible. For instance, the first diagnosis, the second diagnosis and the third diagnosis may be performed in series or two of the diagnoses may be performed in parallel, etc.

At 440, the multipath unit 120 determines if the access path is in healthy status based on the diagnosis results of the first diagnosis, the second diagnosis and the third diagnosis. For instance, the multipath unit 120 can make the determination by means of the failure diagnosis module 200.

At 450, in response to determining that the access path is in healthy status, the multipath unit 120 can instruct to retry the path, for instance, until the retrying times exceed a predetermined maximum value. In some embodiments, the multipath unit 120 can send the instruction with the path selection module 250. At 460, in response to determining that the access path is in unhealthy status, the multipath unit 120 can detect if a backup access path is available.

At 470, in response to determining that a backup access path is available, the multipath unit 120 can instruct to use the backup access path to access the storage device 130. At 480, in response to detecting that no backup access path is available, the multipath unit 120 can indicate an access operation failure for the storage device 130. In some embodiments, the multipath unit 120 can send these instructions and indications with the path selection module 250.

Figure 5:
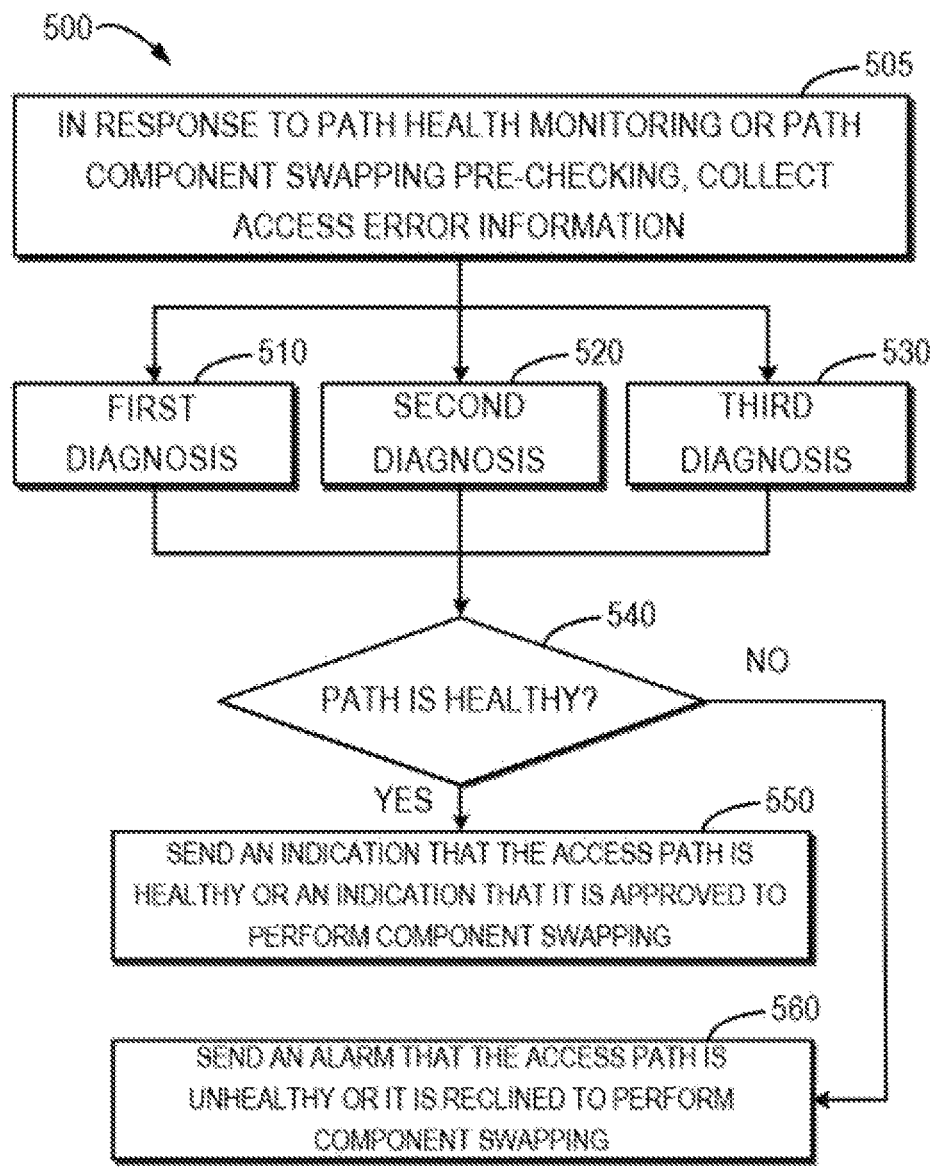
FIG. 5 schematically illustrates a process of a path health monitoring function and a path component swapping pre-checking function of the storage management method according to the embodiments of the present disclosure.

FIG. 5 schematically illustrates a process 500 of the path health monitoring function and the path component swapping pre-checking function of the storage management method according to the embodiments of the present disclosure. The process 500 depicts a specific processing process of the multipath unit 120 when performing the path health monitoring function and the path component swapping pre-checking function. Therefore, the process 500 belongs to a specific implementation of method 300 shown in FIG. 3. It is to be understood that FIG. 5 only depicts an example, without intention to limit the embodiments of the present disclosure in any manner.

As shown in FIG. 5, at 505, in response to health monitoring or component swapping pre-checking of an access path, the multipath unit 120 collects information about an access error in the access path. For example, the multipath unit 120 can obtain the information from the error information providing module 270.

At 510, 520 and 530, the multipath unit 120 can perform the first diagnosis, the second diagnosis and the third diagnosis, respectively. For example, the multipath unit 120 can perform the first diagnosis, the second diagnosis, and the third diagnosis by means of the first diagnosis module 210, the second diagnosis module 220 and the third diagnosis module 230, respectively. The specific content and diagnosing process of the first diagnosis, the second diagnosis and the third diagnosis have been described above in detail, thus omitted here. It is to be understood that although blocks 510, 520 and 530 in FIG. 5 are depicted to be performed in parallel, other implementations are also possible. For instance, the first diagnosis, the second diagnosis and the third diagnosis may be performed in series or two of the diagnoses may be performed in parallel, etc.

At 540, the multipath unit 120 determines if the access path is in healthy status based on the diagnosis results of the first diagnosis, the second diagnosis and the third diagnosis. For instance, the multipath unit 120 can make the determination by means of the failure diagnosis module 200.

At 550, in response to determining that the access path is in healthy status, the multipath unit 120 may send an indication that the access path is in healthy status or an indication that it is approved to perform component swapping for the access path whose component needs to be swapped. For example, the multipath unit 120 may send the indications with the path health monitoring module 260 and the component swapping pre-checking module 240, respectively.

At 560, in response to determining that the access path is in unhealthy status, the multipath unit 120 may send an alarm that the access path is in unhealthy status or an indication that it is declined to perform component swapping for the access path whose component needs to be swapped. For example, the multipath unit 120 may send the alarm or instruction by means of the path health monitoring module 260 and the component swapping pre-checking module 240, respectively. In some embodiments, the alarm may contain a label of the diagnosis from which the access path is determined to be unhealthy. For example, if the diagnosis result of the first diagnosis related to a topology is in unhealthy status, then the alarm may contain a label indicating the first diagnosis.

Figure 6:
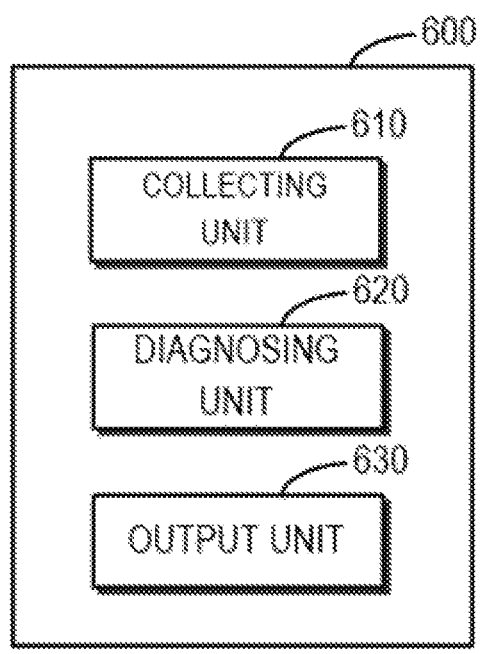
FIG. 6 schematically illustrates a block diagram of a storage management apparatus according to the embodiments of the present disclosure.

FIG. 6 schematically illustrates a block diagram of a storage management apparatus 600 according to the embodiments of the present disclosure. It can be appreciated by those skilled in the art that FIG. 6 only illustrates units or components of the apparatus 600 closely related to the present disclosure. In some embodiments, the apparatus 600 may further include other functional units or components that enable its normal operation. Moreover, the units or components shown in FIG. 6 may have necessary connections which are not depicted in FIG. 6 for the sake of clarity. In some embodiments, the apparatus 600 can be configured to implement the storage management method 300 described with reference to FIG. 3.

As shown in FIG. 6, the apparatus 600 includes a collecting unit 610, a diagnosing unit 620 and an output unit 630. The collecting unit 610 is configured to collect information indicating an access error in an access path for accessing a storage device. The diagnosing unit 620 is configured to perform a failure diagnosis for the access path based on the access error, the failure diagnosis including at least one of a first diagnosis related to a topology, a second diagnosis related to a history access error, or a third diagnosis related to a protocol. The output unit 630 is configured to provide an output related to health status of the access path based on the failure diagnosis.

In some embodiments, the diagnosing unit 620 may be further configured to: detect at least one access path which is topologically associated with the access path and in which the access error also occurs; in response to the at least one associated access path being detected, determine the number of the at least one associated access path; and in response to the number of the at least one associated access path being greater than a first threshold, determine that a topology of the access path is in unhealthy status. In these embodiments, the diagnosing unit 620 can be further configured to: obtain topology information of access paths of the storage device; detect candidate access paths topologically associated with the access path based on the topology information; and determine at least one of the candidate access paths with the access error occurred as the at least one associated access path. In some embodiments, the output unit 630 can be further configured to: in response to determining that the access path is in the unhealthy status through the first diagnosis, indicate that there is a failure in a common component of the access path and the at least one associated access path.

In some embodiments, the diagnosing unit 620 can be further configured to: determine an occurrence number of the access error in the access path in the past; and in response to the occurrence number being greater than a second threshold, determine that the access path is in unhealthy status. In these embodiments, the output unit 630 can be further configured to: in response to determining that the access path is in the unhealthy status through the second diagnosis, instruct to abandon reinstallation of the access path.

In some embodiments, the diagnosing unit 620 can be further configured to: count errors related to a protocol in the access path; and in response to the number of errors being greater than a third threshold, determine that the access path is in unhealthy status. The errors related to a protocol may include at least one of an error at a protocol layer of a small computer system interface (SCSI), an error at a protocol layer of a serial small computer system interface (SAS), or an error specific to a vendor.

In some embodiments, the output unit 630 can be further configured to: in response to determining that the access path is in the unhealthy status through the failure diagnosis, search for an available backup access path; in response to a hit of the available backup access path, provide an indication of the backup access path; and in response to failing to hit the available backup access path, provide an indication of an access operation failure.

In some embodiments, the output unit 630 can be further configured to: in response to determining that the access path is in the unhealthy status through the failure diagnosis, send a failure alarm for the access path as a response to path health monitoring.

In some embodiments, the output unit 630 can be further configured to: in response to determining that the access path is in the unhealthy status through the failure diagnosis, provide an indication that the access path is unable to be a backup access path for a further access path.

Figure 7:
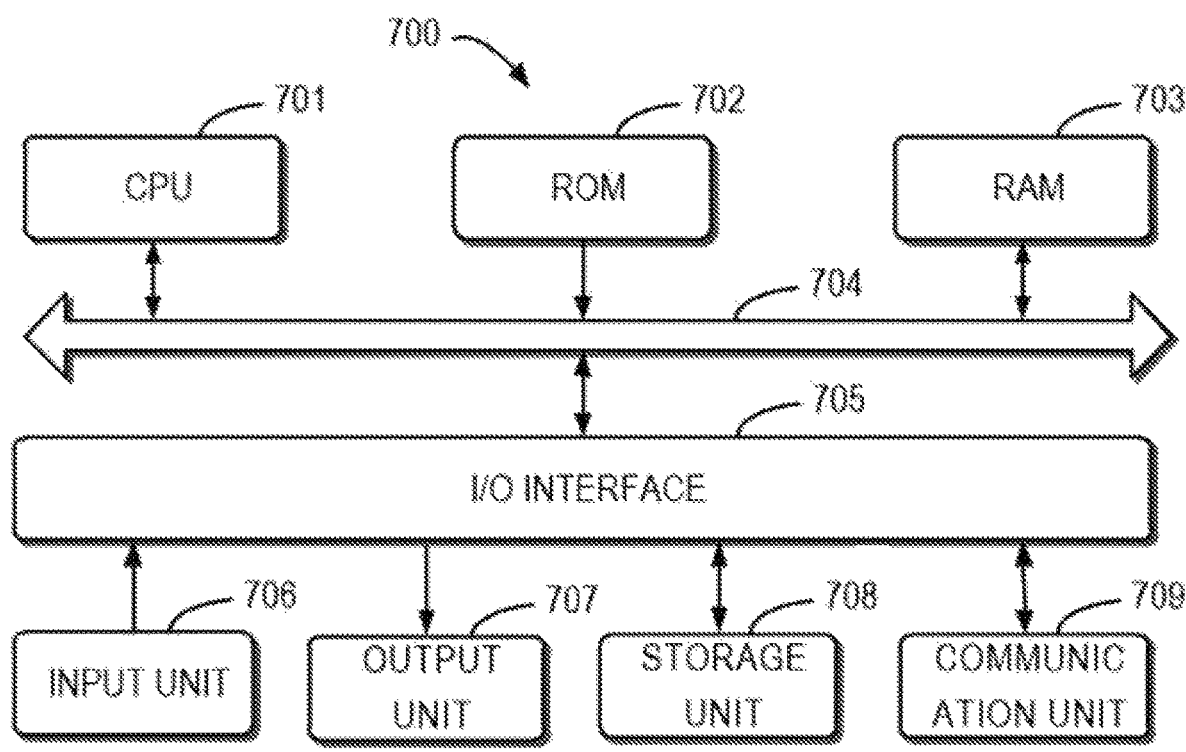
FIG. 7 schematically illustrates a block diagram of a device that may be used to implement the embodiments of the present disclosure.

FIG. 7 schematically illustrates a block diagram of an apparatus 700 that can be used to perform the embodiments of the present disclosure. As shown in FIG. 7, the apparatus 700 includes a central processing unit (CPU) 701, which may perform various appropriate actions and processing based on the computer program instructions stored in the read-only memory (ROM) 702 or the computer program instructions loaded from the storage unit 708 to the random access memory (RAM) 703. In RAM 703, there further stores various programs and data needed by operation of the storage device 700. CPU 701, ROM 702, and RAM 703 are connected one another via a bus 704. The input/output (I/O) interface 705 is also connected to the bus 704.

A plurality of components of apparatus 700 are connected to the I/O interface 705, including: an input unit 706 comprising a keyboard, a mouse, and the like; an output unit 707 including such as displays and loudspeakers of various types; a storage unit 708 including a magnetic disk and compact disk and the like; and a communication unit 709 including a network interface, a modem, a wireless transceiver and so on. The communication unit 709 allows the apparatus 700 to exchange information/data with other apparatuses via, for instance, computer network like Internet and/or various telecommunications network.

The processes and processing described above, such as the method 300, can be implemented by the processing unit 701. For example, in some embodiments, method 300 can be implemented as the computer software program which is tangibly contained in a machine readable medium, for instance, storage unit 708. In some embodiments, a part of or all of the computer programs can be loaded and/or mounted on the apparatus 700 via ROM 702 and/or communication unit 709. When the computer program is loaded to RAM 703 and implemented by CPU 701, one or more steps of method 300 described in the above text can be implemented.

In the present disclosure, there is proposed a multipath solution based on multidimensional health diagnosis. Different from the existing health diagnosis methods, it derives its idea from a system-wide perspective. It collects different kinds of errors and tries to mine useful information from error correlation to help determine path health status. This mined information may include a plurality of dimensions: a dimension of history (whether the same errors happen on the same path in the past), a dimension of topology (if similar errors happen on more than one path at the same time) and a dimension of protocol (apart from SCSI errors, attempting to obtain some protocol error information or errors specific to a vendor). This kind of multi-dimensional analysis provides more intelligence and helps to perform path health diagnosis more efficiently and accurately. More importantly, it can help solve different problems actually happening in the current storage product environment. Furthermore, in a future storage system, the multipath method based on multidimensional health diagnosis according to the embodiments of the present disclosure can be optimized continuously to improve user experience.

The storage management method and electronic device according to the embodiments of the present disclosure can achieve various technical advantages compared with the existing solutions. First, they are more efficient and can detect the problematic path in time and solve the first problematic situation mentioned above (endless loop of failure/reactivation). Second, they have better performance and can help the path selection function in identifying the problematic path and avoid scheduling I/O to the problematic path. Third, they have better storage availability, for example, more accurate path health pre-checking can help ensure healthy status of a backup path. From the perspective of service reliability, they improve storage availability during swapping of a component (for instance, an HBA).

As used herein, the term "includes" and its variants are to be read as open-ended terms that mean "includes, but is not limited to." The term "based on" is to be read as "based at least in part on." The terms "one embodiment" and "the embodiment" are to be read as "at least one embodiment." As used in the text, the term "determine" covers various actions. For example, "determine" may include operating, calculating, processing, deriving, examining, looking up (such as look up in a table, a database or another data structure), finding out and so on. Furthermore, "determine" may include receiving (such as receiving information), accessing (such as access data in the memory) and so on. Meanwhile, "determine" may include analyzing, choosing, selecting, establishing and the like.

It should be noted that the embodiments of the present disclosure can be realized by hardware, software or a combination of hardware and software, where the hardware pan can be implemented by a special logic; the software part can be stored in a memory and executed by a suitable instruction execution system such as a microprocessor or a special-purpose hardware. Ordinary skilled in the art may understand that the above system and method may be implemented with computer executable instructions and/or in processor-controlled code which is provided on a carrier medium such as a programmable memory or a data bearer such as an optical or electronic signal bearer.

Further, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, or a step may be divided into a plurality of steps for execution. It will be noted that the features and functions of two or more units described above may be embodied in one unit. In turn, the features and functions of one unit described above may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

We claim:

1. A method of storage management, comprising:
    collecting information indicating an access error in an access path for accessing a storage device;
    performing, on the access path based on the access error, a first diagnosis related to topology errors, a second diagnosis related to history access errors, and a third diagnosis related to protocol errors; and
    providing, based on a correlation of the topology errors, the history access errors, and the protocol errors, an output indicating whether a current status of the access path is healthy or unhealthy,
    wherein performing the second diagnosis related to the history access errors includes determining, in a time window, a number of past occurrences of the same access error in the same access path, and, in response to the number of past occurrences exceeding an error history threshold, determining that the current status of the access path is unhealthy, and
    wherein providing the output includes, having determined that the current status of the access path is unhealthy based on the number of past occurrences in the time window exceeding the error history threshold, providing the output indicating that the current status of the access path is unhealthy.

2. The method of claim 1, wherein performing the first diagnosis on the access path comprises:
    detecting at least one access path which is topologically associated with the access path and in which the access error also occurs;
    in response to the at least one associated access path being detected, determining a number of the at least one associated access path; and
    in response to the number of the at least one associated access path being greater than a topology error threshold, determining that a topology of the access path is in unhealthy status.

3. The method of claim 2, wherein detecting the at least one associated access path comprises:
    obtaining topology information of access paths of the storage device;
    detecting, based on the topology information, candidate access paths topologically associated with the access path; and
    determining at least one of the candidate access paths with the access error occurred as the at least one associated access path.

4. The method of claim 2, wherein providing the output indicating whether a current status of the access path is healthy or unhealthy comprises:
    in response to determining that the current status of the access path is unhealthy through the first diagnosis, indicating that there is a failure in a common component of the access path and the at least one associated access path.

5. The method of claim 1, wherein providing the output indicating whether a current status of the access path is healthy or unhealthy comprises:
    in response to determining that the current status of the access path is unhealthy through the second diagnosis, instructing to abandon reinstallation of the access path.

6. The method of claim 1, wherein performing the third diagnosis on the access path comprises:
    counting errors related to a protocol in the access path; and
    in response to a number of the errors being greater than a third protocol error threshold, determining that the access path is in unhealthy status.

7. The method of claim 6, wherein counting the errors related to a protocol include receiving protocol messages containing respective protocol layer error codes and associated error reasons.

8. The method of claim 7, wherein the protocol layer error codes include first codes describing path-related failures and second codes describing other failures, and wherein performing the third diagnosis includes (1) based on receiving the first codes, determining that a failure of the access path is a path-related failure, and (2) based on receiving the second codes, determining that the failure of the access path is a device-related failure of the storage device and not a path-related failure.

9. The method of claim 6, wherein the errors related to a protocol include at least one of the following: an error at a protocol layer of a small computer system interface (SCSI), an error at a protocol layer of a serial small computer system interface (SAS), or an error specific to a vendor.

10. The method of claim 1, wherein providing the output indicating whether a current status of the access path is healthy or unhealthy comprises:
in response to determining that the current status of the access path the unhealthy through one or more of the first diagnosis, the second diagnosis, and the third diagnosis, searching for an available backup access path;
in response to a hit of the available backup access path, providing an indication of the available backup path; and
in response to failing to hit the available backup access path, providing an indication of an access operation failure.

11. The method of claim 1, wherein providing the output indicating whether a current status of the access path is healthy or unhealthy comprises:
in response to determining that the current status of the access path is unhealthy through one or more of the first diagnosis, the second diagnosis, and the third diagnosis, sending a failure alarm for the access path as a response to path health monitoring.

12. The method of claim 1, wherein providing the output indicating whether a current status of the access path is healthy or unhealthy comprises:
in response to determining that the current status of the access path is unhealthy through one or more of the first diagnosis, the second diagnosis, and the third diagnosis, providing an indication that the access path is unable to be a backup access path for a further access path.

13. The method of claim 1, wherein performing the second diagnosis related to history access errors further comprises:
in response to the number of past occurrences being greater than the error history threshold, avoiding one or more of reactivating the access path and performing a host reset.

14. An electronic device, comprising:
at least one processor; and
at least one memory including computer program instructions, the at least one memory and the computer program instructions configured, with the processor, to cause the device to:
collect information indicating an access error in an access path for accessing a storage device;
perform, on the access path based on the access error, a first diagnosis related to topology errors, a second diagnosis related to history access errors, and a third diagnosis related to protocol errors; and
provide, based on a correlation of the topology errors, the history access errors, and the protocol errors, an output indicating whether a current status of the access path is healthy or unhealthy,
wherein performing the second diagnosis related to the history access errors includes determining, in a time window, a number of past occurrences of the same access error in the same access path, and, in response to the number of past occurrences exceeding an error history threshold, determining that the current status of the access path is unhealthy, and
wherein the providing of the output includes, having determined that the current status of the access path is unhealthy based on the number of past occurrences in the time window exceeding the error history threshold, providing the output indicating that the current status of the access path is unhealthy.

15. The device of claim 14, wherein the at least one memory and the computer program instructions are further configured, with the processor, to cause the device to perform the first diagnosis on the access path by:
detecting at least one access path which is topologically associated with the access path and in which the access error also occurs;
in response to the at least one associated access path being detected, determining a number of the at least one associated access path; and
in response to the number of the at least one associated access path being greater than a topology error threshold, determining that a topology of the access path is in unhealthy status.

16. The device of claim 15, wherein the at least one memory and the computer program instructions are further configured, with the processor, to cause the device to detect the at least one associated access path by:
obtaining topology information of access paths of the storage device;
detecting, based on the topology information, candidate access paths topologically associated with the access path; and
determining at least one of the candidate access paths with the access error occurred as the at least one associated access path.

17. The device of claim 15, wherein the at least one memory and the computer program instructions are further configured, with the processor, to cause the device to provide the output indicating whether a current status of the access path is healthy or unhealthy by:
in response to determining that the current status of the access path is unhealthy through the first diagnosis, indicating that there is a failure in a common component of the access path and the at least one associated access path.

18. The device of claim 14, wherein the at least one memory and the computer program instructions are further configured, with the processor, to cause the device to provide the output indicating whether a current status of the access path is healthy or unhealthy by:
in response to determining that the current status of the access path is unhealthy through the second diagnosis, instructing to abandon reinstallation of the access path.

19. The device of claim 14, wherein the at least one memory and the computer program instructions are further configured, with the processor, to cause the device to perform the third diagnosis on the access path by:
counting errors related to a protocol in the access path; and in response to a number of the errors being greater than a third protocol error threshold, determining that the access path is in unhealthy status.

20. The device of claim 19, wherein the errors related to a protocol include at least one of the following: an error at a protocol layer of a small computer system interface (SCSI), an error at a protocol layer of a serial small computer system interface (SAS), or an error specific to a vendor.

21. The device of claim 14, wherein the at least one memory and the computer program instructions are further configured, with the processor, to cause the device to provide the output indicating whether a current status of the access path is healthy or unhealthy by:
   in response to determining that the current status of the access path is unhealthy through one or more of the first diagnosis, the second diagnosis, and the third diagnosis, searching for an available backup access path;
   in response to a hit of the available backup access path, providing an indication of the available backup path; and
   in response to failing to hit the available backup access path, providing an indication of an access operation failure.

\* \* \* \* \*